United States Patent [19]

Comte et al.

[11] Patent Number: 5,789,993
[45] Date of Patent: Aug. 4, 1998

[54] AMPLITUDE/FREQUENCY CORRECTING DEVICE AND CORRESPONDING FREQUENCY EQUALIZER

[75] Inventors: Michel Comte, Franconville; Nathalie Roche, Conflans Ste Honorine, both of France

[73] Assignee: Alcatel N.V., Rijswijk, Netherlands

[21] Appl. No.: 776,921

[22] PCT Filed: Jun. 12, 1996

[86] PCT No.: PCT/FR96/00888

§ 371 Date: Feb. 11, 1997

§ 102(e) Date: Feb. 11, 1997

[87] PCT Pub. No.: WO97/00560

PCT Pub. Date: Jan. 3, 1997

[30] Foreign Application Priority Data

Jun. 14, 1995 [FR] France ................ 95 07072

[51] Int. Cl.[6] ............................................. H03H 7/03
[52] U.S. Cl. ...................... 333/18; 333/28 R; 333/167
[58] Field of Search ........................ 333/18, 28 R, 333/167

[56] References Cited

U.S. PATENT DOCUMENTS 2,606,970   8/1952   Scott ............................... 333/18
4,413,240  11/1983   Dyke ............................. 333/17.1

FOREIGN PATENT DOCUMENTS 1-91512   4/1989   Japan ................................ 333/18
2000933   1/1979   United Kingdom .

*Primary Examiner*—Paul Gensler
*Attorney, Agent, or Firm*—Sughrue, Mion, Zinn, Macpeak & Seas, PLLC

[57] ABSTRACT

A device (1) for correcting the amplitude/frequency characteristic of an input signal (FI), particularly from transmission cables (40), having a minimal frequency f1, a center frequency f0 and a maximal frequency f2, the input signal (FI) having an attenuation as a function of frequency characteristic that increases between f1 and f2, the correction device (1) supplying a corrected output signal ($\tilde{\text{FI}}$). The correction device includes two cascaded filters (41, 42), the first of the filters receiving the input signal (FI) and supplying a filtered signal (SFI) to the second of the filters, the second of the filters supplying the corrected output signal ($\tilde{\text{FI}}$). One of the filters is a band-stop filter (41) having a center frequency f3 less than or equal to f1, the other of the filters being a band-pass filter (42) having a center frequency f4 greater than or equal to f2. The center frequencies f3 and f4 satisfy the equation:

$$f3 \times f4 = f0^2$$

The filters (41, 42) are of the same order and their Q-factors are adjusted by a control signal (SC) from a control device (43).

7 Claims, 3 Drawing Sheets

AMPLITUDE/FREQUENCY CORRECTING DEVICE AND CORRESPONDING FREQUENCY EQUALIZER

BACKGROUND OF THE INVENTION

The field of the invention is that of transmission systems and more precisely concerns a device for equalizing the amplitude/frequency characteristic of a wide-band signal having an attenuation as a function of frequency characteristic that increases between its maximal and minimal frequencies. One preferred application of the invention is to correcting a signal that has passed through a transmission cable and the following description is given against this background.

Transmitting a microwave or intermediate frequency signal through a cable raises the problem known in itself of distortion of the signal at the receiving end. The signal transmitted, which is symmetrical about the center frequency (intermediate frequency or microwave frequency) at the transmitting end, has a lack of symmetry at the receiving end characterized by amplitudes of the received signal that are different below and above the center frequency. The distorted spectrum must then be returned to its original, symmetrical shape at the receiving end, using a frequency equalizer. The function of a frequency equalizer is therefore to modify the spectrum of a received signal to compensate for the attenuation characteristic of the cable, which is an increasing characteristic as a function of frequency.

FIG. 1 shows the spectrum of an intermediate frequency signal affected by "skew", i.e. a lack of symmetry in the amplitude/frequency characteristic. The center frequency f0 corresponds to the intermediate frequency and the minimal and maximal frequencies are f1 and f2, respectively. The bandwidth $\Delta f$, equal to f2–f1, is due to the modulation. The amplitudes of the frequencies less than and greater than f0 are not equal, which is characteristic of the skew.

FIG. 2 shows the attenuation as a function of frequency characteristic of a cable, for example that of a coaxial cable. The characteristic 20 has an attenuation of $x \cdot \sqrt{f/f0}$ due to the properties of the transmission cable. The value of x is expressed in dB/m and corresponds to the amplitude attenuation of a signal at frequency f0. The frequencies f1 and f2 are not attenuated in the same manner, which causes the amplitude defect.

As previously indicated, the amplitude/frequency characteristic of a signal can be corrected using a frequency equalizer, for example an adaptive equalizer. All adaptive frequency equalizers include a correction device, for example a transversal filter, receiving an input signal and supplying a corrected output signal to a device for estimating the amplitude/frequency characteristic of the output signal. The estimator device controls the transversal filter to correct this characteristic.

FIG. 3 shows the structure of a frequency equalizer of this kind.

An intermediate frequency signal FI is applied to the input of a corrector device 1 the output of which is an intermediate frequency signal $\widetilde{FI}$ having a corrected amplitude/frequency characteristic. This signal $\widetilde{FI}$ is applied to two narrow-band filters 2, 3 the respective center frequencies f1 and f2 of which are in the spectrum of the signal FI, as shown in FIG. 1.

The amplitudes of the signals from the filters 2 and 3 allow for the deformation of the spectrum and it is therefore possible to control the correction device 1 so that the amplitude of the signals that it delivers are substantially identical on either side of the frequency f0. The device 1 is controlled by processor means 4 that generate correction coefficients applied to the filter 1. The filter 1, the narrow-band filters 2 and 3 and the processor means 4 form an intermediate frequency equalizer. This corrects for the amplitude/frequency response of the propagation medium, i.e. the amplitude/frequency characteristic of the processed signal, and the corrected spectrum is flat and symmetrical between f1 and f2, i.e. free of skew.

The corrected signal $\widetilde{FI}$ can then be applied to an amplifier having a gain which is determined by an automatic gain control device, this amplifier supplying a signal of constant amplitude. The amplifier may be followed by frequency converter means, such as mixers receiving two signals in phase quadrature from a local oscillator operating at the intermediate frequency f0.

The correction device previously referred to is usually a transversal filter or a resonant circuit the resonant frequency and the Q-factor of which can be modified by the processor means 4.

The disadvantage of these two types of correction devices is that they introduce a group propagation delay (in the case of resonant circuits) or their structure is complex (in the case of a transversal filter).

More generally, one disadvantage of the frequency equalizers employed is that it is necessary to know the bandwidth $\Delta f$ of the signal to be corrected with great accuracy in order to enable adjustment of the center frequencies of the filters 2 and 3. In this case it is not possible to modify the bandwidth of the signal at the transmitting end, i.e. the transmitted bit rate.

SUMMARY OF THE INVENTION

One objective of the present invention is to eliminate this disadvantages.

To be more precise, one objective of the invention is to provide a device for correcting the amplitude/frequency characteristic of a signal having an attenuation as a function of frequency characteristic that increases between its minimal and maximal values, typically a signal from a transmission cable, this device having no group propagation delay in the wanted band.

Another objective of the invention is to provide a frequency equalizer employing a correction device of the above kind, this equalizer having a structure allowing modification of the transmitted bit rate.

These objectives, and others that will emerge below, are achieved by a device for correcting the amplitude/frequency characteristic of an input signal having a minimal frequency f1, a center frequency f0 and a maximal frequency f2, the input signal having an attenuation as a function of frequency characteristic that increases between f1 and f2, the correction device supplying a corrected output signal, this device including two cascaded filters, the first of the filters receiving the input signal and supplying a filtered signal to the second of the filters, the second of the filters supplying the corrected output signal, one of the filters being a band-stop filter having a center frequency f3 less than or equal to f1 and the other of the filters being a band-pass filter having a center frequency f4 greater than or equal to f2, the center frequencies f3 and f4 satisfying the equation:

$$f3 \times f4 = f0^2$$

the filters being of the same order and their Q-factor being adjusted by a control signal from a control device.

The control signal is preferably an automatic gain control signal from an automatic gain control device.

The filters used are advantageously first order filters in order to limit the attenuation introduced and each can be based on LC type networks for example.

Each of these filters may cooperate with a PIN type diode to enable adjustment of their Q-factor.

The input signal is preferably a signal that has passed through a cable.

The invention also concerns a frequency equalizer including a correction device of this kind.

BRIEF DESCRIPTION OF THE DRAWINGS

Other features and advantages of the invention will emerge from a reading of the following description of a preferred embodiment, given by way of non-limiting illustrative example, and from the accompanying drawings, in which.

DETAILED DESCRIPTION OF THE INVENTION

Figure 1:
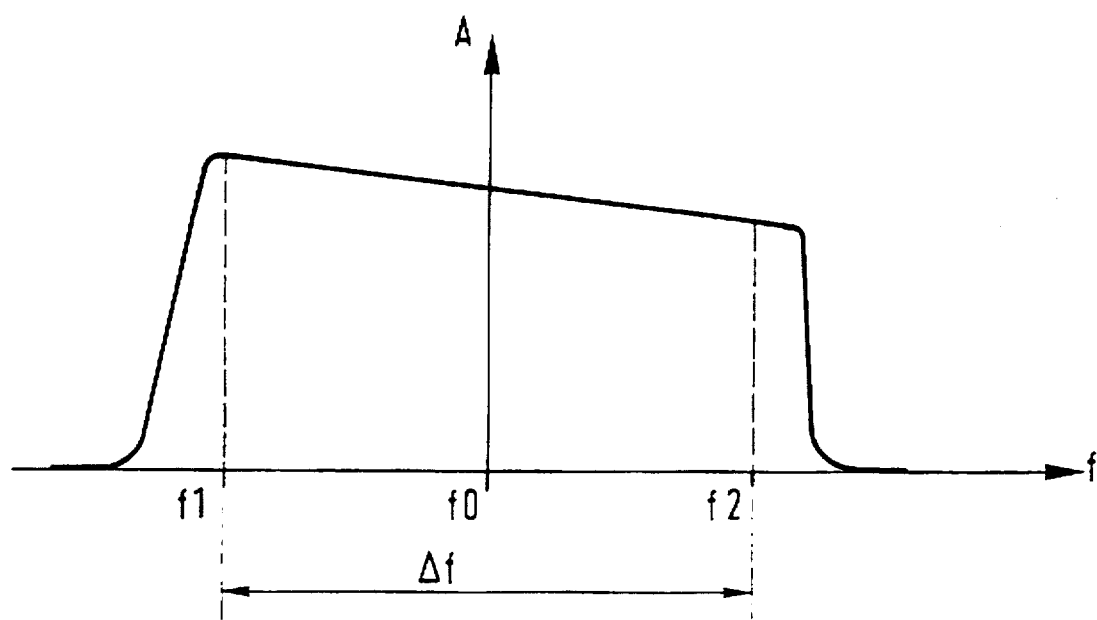
FIG. 1 shows the spectrum of an intermediate frequency signal affected by skew.
Figure 2:
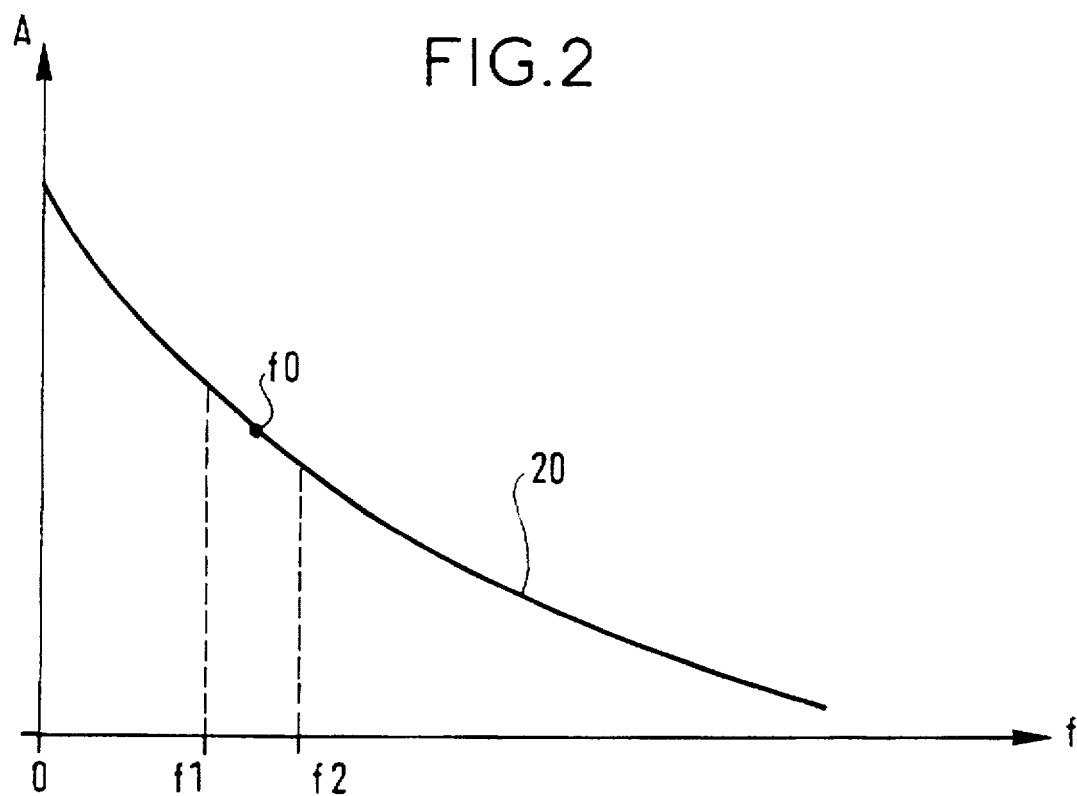
FIG. 2 shows the attenuation as a function of frequency characteristic of a cable.
Figure 3:
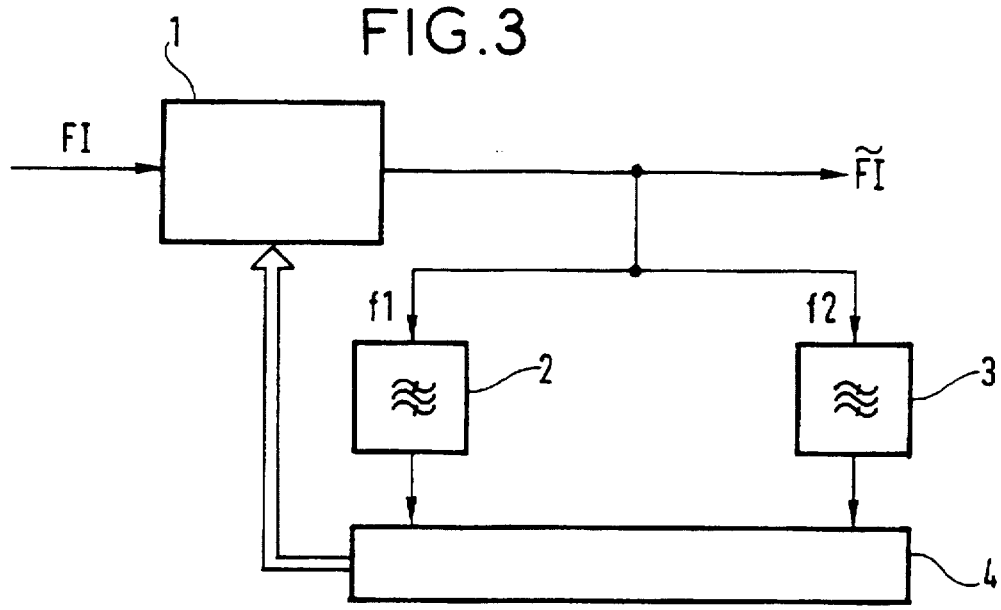
FIG. 3 shows the general structure of a frequency equalizer.
Figure 4:
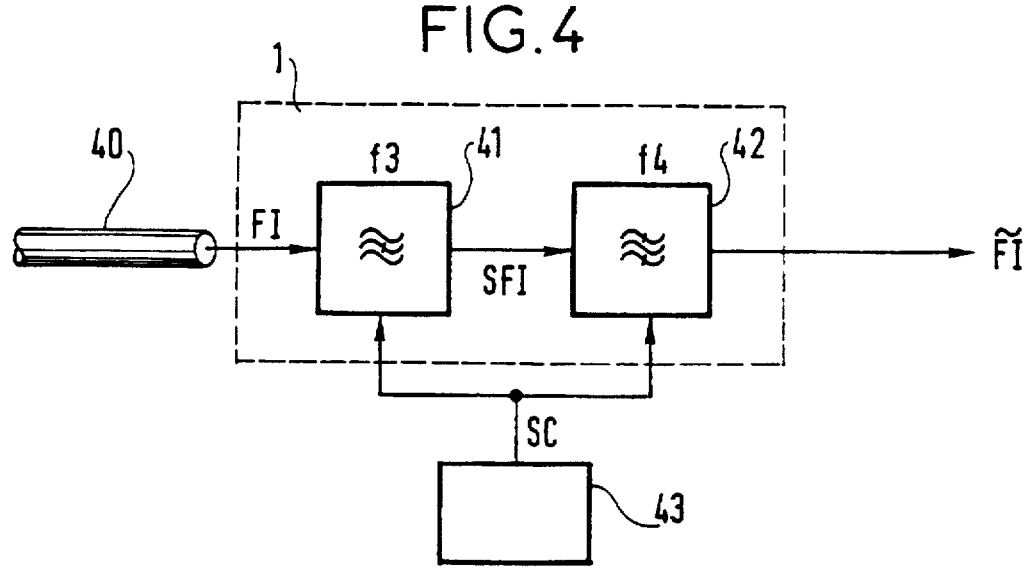
FIG. 4 is a block diagram of a correction device of the invention.

FIGS. 1 to 3 have been described previously with reference to the prior art. FIG. 4 is a block diagram of a correction device of the invention.

The correction device 1 of FIG. 4 receives at its input a signal FI (an intermediate frequency signal in this example) from a cable 40, for example a coaxial cable.

The device 1 includes two filters 41 and 42 in cascade. The first filter 41 receives the input signal FI and supplies a filtered signal SFI to the second filter 42 which supplies the corrected output signal $\overline{FI}$.

In accordance with the invention, one of the filters, the first filter 41 in this example, is a band-stop filter with a center frequency f3 less than or equal to f1, the other filter, the second filter 42 in this example, being a band-pass filter with a center frequency f4 greater than or equal to f2. The filters 41 and 42 are of the same order, for example of the first order, and the center frequencies f3 and f4 satisfy the equation $$f3 \times f3 = f0^2,$$

where f0 is the center frequency of the signal FI to be corrected.

The Q-factors of the filters 41 and 42 are adjusted by a control signal SC from a control device 43.

Figure 5:
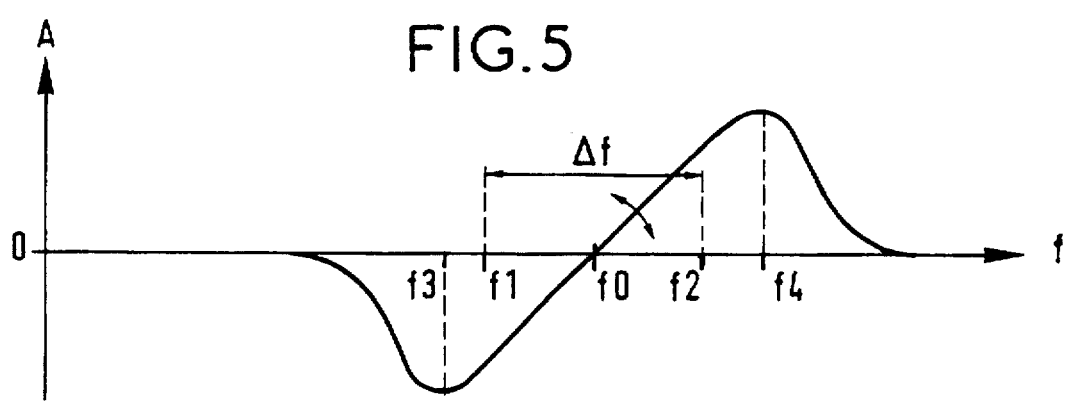
FIG. 5 shows the response curve of the correction device of the invention.

FIG. 5 shows the frequency response curve obtained by cascading these two filters.

The band-stop filter 41 has the center frequency f3 and the band-pass filter 42 has the center frequency f4. These center frequencies are on opposite side of the bandwidth $\Delta f$ equal to f2-f1. Cascading a band-stop filter and a band-pass filter of the same order produces an attenuation as a function of frequency characteristic having the opposite slope to the signal FI to be corrected (see FIG. 1). The Q-factors of the filters are equal and adjustable, which makes it possible to tilt the attenuation as a function of frequency characteristic about f0, i.e. in the band $\Delta f$, and thereby to compensate perfectly the amplitude/frequency characteristic of the signal FI.

In practise it is beneficial for the frequencies f1 and f2 to be in a linear part of the resultant characteristic, i.e. at a level of 3 dB above or below the levels of the frequencies f3 and f4, respectively.

The required correction is obtained without modification of the group propagation delay in the band.

To limit the attenuation introduced, first order filters are advantageously chosen (with an attenuation of 20 dB per decade), especially if the bandwidth $\Delta f$ is large.

Figure 6:
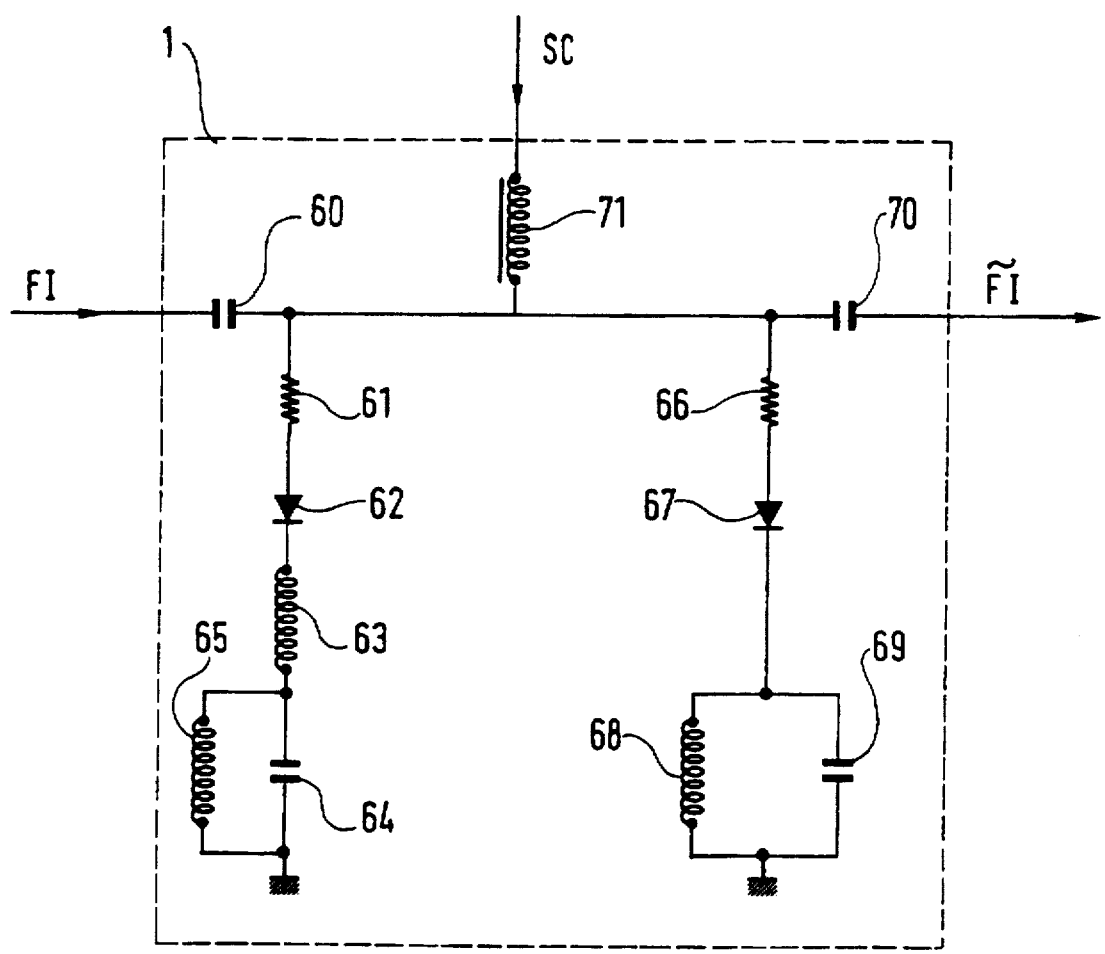
FIG. 6 shows a preferred embodiment of the correction device of the invention.

FIG. 6 shows one preferred embodiment of the correction device of the invention, using first order filters.

The input signal FI to be corrected is fed through a blocking capacitor 60 to a first processor channel comprising in series a resistor 61, a PIN diode 62, an inductor 63 and a capacitor 64. The PIN diode 62 is used as a variable resistor, its internal resistance depending on the voltage of the control signal SC which is applied through a high-impedance inductor 71. The cathode of the PIN diode 62 is connected to the inductor 63 forming, with the capacitor 64, a first order band-stop filter having a center frequency f3. An inductor 65 in parallel with the capacitor 64 enables flow of direct current.

The signal from the capacitor 60 is also applied to a second processor channel comprising in series a resistor 66, a PIN diode 67 and an inductor 68. A capacitor 69 is connected in parallel with the inductor 68 to form a first order band-pass filter with the center frequency f4. The PIN diode 67 is also used as a variable resistor, its internal resistance being also dependent on the voltage of the control signal SC.

The resistors 61 and 66 are for calibrating the Q-factors of the band-stop and band-pass filters. Their values are preferably identical and determined according to the maximal skew to be corrected. The PIN diodes 62 and 67 are also preferably identical.

The corrected signal $\overline{FI}$ is fed to the output via another blocking capacitor 70. There is no signal SFI with this diagram because the structure is entirely parallel. There would be a signal SFI if the resistors 61 and 66 were isolated and if the signal SC were applied independently to these two resistors.

The operation of this embodiment is as follows: the greater the level of the signal SC, the more strongly the diodes 62 and 67 conduct. The Q-factors of the band-stop and band-pass filters are then high, which corresponds to a high slope of the linear part of the FIG. 5 characteristic. The resulting skew correction is then high. On the other hand, for a zero level of the control signal SC the resistances of the diodes 62 and 67 are high, which corresponds to a low (or even zero) slope of the linear part of the FIG. 5 characteristic. The skew correction obtained is then low, or even zero.

The Q-factors of the filters are equal to $Q = L\omega/R = RC\omega$ where the angular frequency $\omega = 1/\sqrt{LC}$, L is the value of the inductors 63 and 68, C is the capacitance of the capacitors 64 and 69 and R is the resistance equal to the respective sums of the resistors 61, 66 and the internal resistances of the diodes 62 and 67. The Q-factors of the two filters are equal.

The filters may instead be cascaded with the band-pass filter first, followed by the band-stop filter, what is essential being that the band-stop filter has a center frequency f3 less than or equal to f1 and that the band-pass filter has a center frequency f4 greater than or equal to f2. The slope of the resulting filter is then always as shown in FIG. 5, opposite to the skew of the input signal FI.

For example, the frequencies f3 and f4 may be respectively equal to 100 MHz and 200 MHz for a center frequency f0 of 140 MHz and a bandwidth Δf of 40 MHz.

The control device generating the control signal SC can be a microprocessor converting data representative of the length of the cable into an appropriate correction level. In this case the correction is determined once and for all, according to the length of the cable.

It is also possible to use a device to estimate the amplitude/frequency characteristic of the corrected output signal $\overline{FI}$, in order to obtain adaptive correction. However, as previously indicated, to avoid the necessity to know the bandwidth Δf of the signal to be corrected very accurately to allow the transmitted bit rate to be modified, the invention proposes to base an estimator device of this kind on an automatic gain control device such as that shown in FIG. 7.

Figure 7:
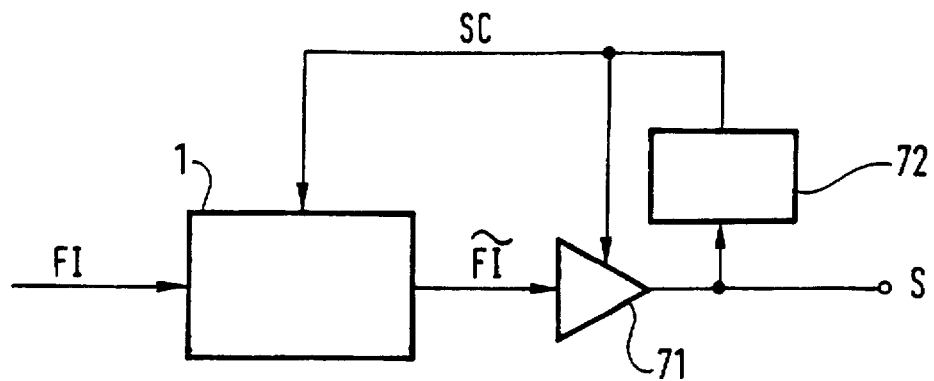
FIG. 7 shows an estimator device for controlling the correction device of the invention.

FIG. 7 shows an automatic gain control device adapted to control the correction device of the invention.

Here the control signal SC is an automatic gain control signal from an automatic gain control device 72. The corrected signal $\overline{FI}$ is applied to an amplifier 71 which also receives the signal SC. The level of the output signal S is constant and independent of the length of the cable used.

The automatic gain control device 72 includes, for example, in the conventional way, a diode for detecting the maximal level of the signal S. The amplifier 71 has a gain that is inversely proportional to the level of the signal FI. Thus here the skew is corrected using an automatic gain control signal.

The signal SC may additionally be applied to another amplifier adapted to amplify the signal FI applied to the input of the correction device 1. Likewise, the control device 72 may be on the input side of the correction device 1.

The input signal FI having an attenuation as a function of frequency characteristic that increases between f1 and f2 may equally well be a signal that has been transmitted by radio.

Of course, the present invention is not limited to the embodiments described above and the person skilled in the art will readily conceive of other solutions that do not depart from the scope of the invention.

We claim:

1. Device (1) for correcting the amplitude/frequency characteristic of an input signal (FI) having a minimal frequency f1, a center frequency f0 and a maximal frequency f2, said input signal (FI) having an attenuation as a function of frequency characteristic that increases between f1 and f2, said correction device (1) supplying a corrected output signal ($\overline{FI}$), characterized in that said correction device includes two cascaded filters (41, 42), the first of said filters receiving said input signal (FI) and supplying a filtered signal (SFI) to the second of said filters, the second of said filters supplying said corrected output signal ($\overline{FI}$), one of said filters being a band-stop filter (41) having a center frequency f3 less than or equal to f1 and the other of said filters being a band-pass filter (42) having a center frequency f4 greater than or equal to f2, the center frequencies f3 and f4 satisfying the equation:

$$f3 \times f3 \times f4 = f0^2$$

said filters (41, 42) being of the same order and their Q-factor (Q) being adjusted by a control signal (SC) from a control device (43).

2. Device according to claim 1 characterized in that said control signal (SC) is an automatic gain control signal from an automatic gain control device (72).

3. Device according to claim 1 characterized in that said filters (41, 42) are first order filters.

4. Device according to claim 1 characterized in that said filters (41, 42) each comprise LC type networks (63, 64; 68, 69).

5. Device according to claim 1 characterized in that said filters are each associated with a PIN type diode (62, 67).

6. Device according to claim 1 characterized in that said input signal (FI) is a signal that has passed through a cable (40).

7. A frequency equalizer including a correction device (1) for correcting the amplitude/frequency characteristic of an input signal in accordance with a control signal and providing a corrected signal, and a control device responsive to the corrected signal for generating said control signal, wherein said correction device comprises a device according to claim 1.

* * * * *